(12) United States Patent
Rüdiger et al.

(10) Patent No.: US 10,852,829 B2
(45) Date of Patent: Dec. 1, 2020

(54) MEASUREMENT OF FACIAL MUSCLE EMG POTENTIALS FOR PREDICTIVE ANALYSIS USING A SMART WEARABLE SYSTEM AND METHOD

(71) Applicant: BRAGI GmbH, Munich (DE)

(72) Inventors: Julius Friedrich Rüdiger, Munich (DE); Peter Vincent Boesen, Munich (DE)

(73) Assignee: BRAGI GmbH, Munich (DE)

( * ) Notice: Subject to any disclaimer, the term of this patent is extended or adjusted under 35 U.S.C. 154(b) by 0 days.

(21) Appl. No.: 15/703,811

(22) Filed: Sep. 13, 2017

(65) Prior Publication Data
US 2018/0074584 A1     Mar. 15, 2018

Related U.S. Application Data

(60) Provisional application No. 62/393,926, filed on Sep. 13, 2016.

(51) Int. Cl.
*G06F 3/01*     (2006.01)
*H04R 1/10*     (2006.01)
(Continued)

(52) U.S. Cl.
CPC .............. *G06F 3/015* (2013.01); *G06F 1/163* (2013.01); *G06F 1/1694* (2013.01); *G06F 3/017* (2013.01);
(Continued)

(58) Field of Classification Search
CPC . G06F 3/015; G06F 3/017; G06F 3/01; G06F 1/163; G06F 3/013; G06F 1/1694;
(Continued)

(56) References Cited

U.S. PATENT DOCUMENTS 2,325,590 A    8/1943   Carlisle et al.
2,430,229 A    11/1947  Kelsey
(Continued)

FOREIGN PATENT DOCUMENTS

CN    204244472 U    4/2015
CN    104683519 A    6/2015
(Continued)

OTHER PUBLICATIONS

Akkermans, "Acoustic Ear Recognition for Person Identification", Automatic Identification Advanced Technologies, 2005 pp. 219-223.
(Continued)

*Primary Examiner* — Richard J Hong
(74) *Attorney, Agent, or Firm* — Goodhue, Coleman & Owens, P.C.

(57) ABSTRACT

A system includes at least one wearable device having a housing, at least one sensor disposed within the housing, at least one output device disposed within the housing, and at least one processor operatively connected to the sensors and output devices, wherein one or more sensors are configured to detect electrical activity from a user's facial muscles and to transmit a data signal concerning the electrical activity of the user's facial muscles to one of more of the processors. A method of controlling a wearable device includes determining facial muscular electrical data of a facial gesture made by a user, interpreting the facial muscular electrical data to determine a user response, and performing an action based on the user response.

10 Claims, 5 Drawing Sheets

(51) Int. Cl.
*G06F 1/16* (2006.01)
*H04R 5/033* (2006.01)

(52) U.S. Cl.
CPC ......... H04R 1/1016 (2013.01); H04R 1/1041 (2013.01); *G06F 2200/1637* (2013.01); *H04R 5/033* (2013.01); *H04R 2420/07* (2013.01); *H04R 2460/13* (2013.01)

(58) Field of Classification Search
CPC .......... G06F 2200/1637; H04R 1/1016; H04R 1/1041; H04R 2420/07; H04R 2460/13; H04R 5/033; H04R 1/1025; H04R 1/1091; H04R 1/083; A61B 5/0488; A61B 5/0059; A61B 5/0285; A63F 13/235; H04W 4/70; H04W 12/0605; G08B 21/06; A45F 5/00
See application file for complete search history.

(56) References Cited

U.S. PATENT DOCUMENTS

| | | | |
|---|---|---|---|
| 3,047,089 A | 7/1962 | Zwislocki | |
| D208,784 S | 10/1967 | Sanzone | |
| 3,586,794 A | 6/1971 | Michaelis | |
| 3,934,100 A | 1/1976 | Harada | |
| 3,983,336 A | 9/1976 | Malek et al. | |
| 4,069,400 A | 1/1978 | Johanson et al. | |
| 4,150,262 A | 4/1979 | Ono | |
| 4,334,315 A | 6/1982 | Ono et al. | |
| D266,271 S | 9/1982 | Johanson et al. | |
| 4,375,016 A | 2/1983 | Harada | |
| 4,588,867 A | 5/1986 | Konomi | |
| 4,617,429 A | 10/1986 | Bellafiore | |
| 4,654,883 A | 3/1987 | Iwata | |
| 4,682,180 A | 7/1987 | Gans | |
| 4,791,673 A | 12/1988 | Schreiber | |
| 4,852,177 A | 7/1989 | Ambrose | |
| 4,865,044 A | 9/1989 | Wallace et al. | |
| 4,934,378 A * | 6/1990 | Perry, Jr. ............... | A61B 5/0488 128/905 |
| 4,984,277 A | 1/1991 | Bisgaard et al. | |
| 5,008,943 A | 4/1991 | Arndt et al. | |
| 5,185,802 A | 2/1993 | Stanton | |
| 5,191,602 A | 3/1993 | Regen et al. | |
| 5,201,007 A | 4/1993 | Ward et al. | |
| 5,201,008 A | 4/1993 | Arndt et al. | |
| D340,286 S | 10/1993 | Seo | |
| 5,280,524 A | 1/1994 | Norris | |
| 5,295,193 A | 3/1994 | Ono | |
| 5,298,692 A | 3/1994 | Ikeda et al. | |
| 5,343,532 A | 8/1994 | Shugart | |
| 5,347,584 A | 9/1994 | Narisawa | |
| 5,363,444 A | 11/1994 | Norris | |
| D367,113 S | 2/1996 | Weeks | |
| 5,497,339 A | 3/1996 | Bernard | |
| 5,606,621 A | 2/1997 | Reiter et al. | |
| 5,613,222 A | 3/1997 | Guenther | |
| 5,654,530 A | 8/1997 | Sauer et al. | |
| 5,692,059 A | 11/1997 | Kruger | |
| 5,721,783 A | 2/1998 | Anderson | |
| 5,748,743 A | 5/1998 | Weeks | |
| 5,749,072 A | 5/1998 | Mazurkiewicz et al. | |
| 5,771,438 A | 6/1998 | Palermo et al. | |
| D397,796 S | 9/1998 | Yabe et al. | |
| 5,802,167 A | 9/1998 | Hong | |
| D410,008 S | 5/1999 | Almqvist | |
| 5,929,774 A | 7/1999 | Charlton | |
| 5,933,506 A | 8/1999 | Aoki et al. | |
| 5,949,896 A | 9/1999 | Nageno et al. | |
| 5,987,146 A | 11/1999 | Pluvinage et al. | |
| 6,021,207 A | 2/2000 | Puthuff et al. | |
| 6,054,989 A | 4/2000 | Robertson et al. | |
| 6,081,724 A | 6/2000 | Wilson | |
| 6,084,526 A | 7/2000 | Blotky et al. | |
| 6,094,492 A | 7/2000 | Boesen | |
| 6,111,569 A | 8/2000 | Brusky et al. | |
| 6,112,103 A | 8/2000 | Puthuff | |
| 6,157,727 A | 12/2000 | Rueda | |
| 6,167,039 A | 12/2000 | Karlsson et al. | |
| 6,181,801 B1 | 1/2001 | Puthuff et al. | |
| 6,208,372 B1 | 3/2001 | Barraclough | |
| 6,230,029 B1 | 5/2001 | Yegiazaryan et al. | |
| 6,270,466 B1 * | 8/2001 | Weinstein ............ | A61B 5/0488 600/590 |
| 6,275,789 B1 | 8/2001 | Moser et al. | |
| 6,339,754 B1 | 1/2002 | Flanagan et al. | |
| D455,835 S | 4/2002 | Anderson et al. | |
| 6,408,081 B1 | 6/2002 | Boesen | |
| 6,424,820 B1 | 7/2002 | Burdick et al. | |
| D464,039 S | 10/2002 | Boesen | |
| 6,470,893 B1 | 10/2002 | Boesen | |
| D468,299 S | 1/2003 | Boesen | |
| D468,300 S | 1/2003 | Boesen | |
| 6,542,721 B2 | 4/2003 | Boesen | |
| 6,560,468 B1 | 5/2003 | Boesen | |
| 6,654,721 B2 | 11/2003 | Handelman | |
| 6,664,713 B2 | 12/2003 | Boesen | |
| 6,690,807 B1 | 2/2004 | Meyer | |
| 6,694,180 B1 | 2/2004 | Boesen | |
| 6,718,043 B1 | 4/2004 | Boesen | |
| 6,738,485 B1 | 5/2004 | Boesen | |
| 6,748,095 B1 | 6/2004 | Goss | |
| 6,754,358 B1 | 6/2004 | Boesen et al. | |
| 6,784,873 B1 | 8/2004 | Boesen et al. | |
| 6,823,195 B1 | 11/2004 | Boesen | |
| 6,852,084 B1 | 2/2005 | Boesen | |
| 6,879,698 B2 | 4/2005 | Boesen | |
| 6,892,082 B2 | 5/2005 | Boesen | |
| 6,920,229 B2 | 7/2005 | Boesen | |
| 6,952,483 B2 | 10/2005 | Boesen et al. | |
| 6,987,986 B2 | 1/2006 | Boesen | |
| 7,010,137 B1 | 3/2006 | Leedom et al. | |
| 7,113,611 B2 | 9/2006 | Leedom et al. | |
| D532,520 S | 11/2006 | Kampmeier et al. | |
| 7,136,282 B1 | 11/2006 | Rebeske | |
| 7,203,331 B2 | 4/2007 | Boesen | |
| 7,209,569 B2 | 4/2007 | Boesen | |
| 7,215,790 B2 | 5/2007 | Boesen et al. | |
| D549,222 S | 8/2007 | Huang | |
| D554,756 S | 11/2007 | Sjursen et al. | |
| 7,403,629 B1 | 7/2008 | Aceti et al. | |
| D579,006 S | 10/2008 | Kim et al. | |
| 7,463,902 B2 | 12/2008 | Boesen | |
| 7,508,411 B2 | 3/2009 | Boesen | |
| D601,134 S | 9/2009 | Elabidi et al. | |
| 7,825,626 B2 | 11/2010 | Kozisek | |
| 7,965,855 B1 | 6/2011 | Ham | |
| 7,979,035 B2 | 7/2011 | Griffin et al. | |
| 7,983,628 B2 | 7/2011 | Boesen | |
| D647,491 S | 10/2011 | Chen et al. | |
| 8,095,188 B2 | 1/2012 | Shi | |
| 8,108,143 B1 | 1/2012 | Tester | |
| 8,140,357 B1 | 3/2012 | Boesen | |
| D666,581 S | 9/2012 | Perez | |
| 8,300,864 B2 | 10/2012 | Müllenborn et al. | |
| 8,406,448 B2 | 3/2013 | Lin et al. | |
| 8,436,780 B2 | 5/2013 | Schantz et al. | |
| D687,021 S | 7/2013 | Yuen | |
| 8,719,877 B2 | 5/2014 | VonDoenhoff et al. | |
| 8,774,434 B2 | 7/2014 | Zhao et al. | |
| 8,831,266 B1 | 9/2014 | Huang | |
| 8,891,800 B1 | 11/2014 | Shaffer | |
| 8,994,498 B2 | 3/2015 | Agrafioti et al. | |
| D728,107 S | 4/2015 | Martin et al. | |
| 9,013,145 B2 | 4/2015 | Castillo et al. | |
| 9,037,125 B1 | 5/2015 | Kadous | |
| D733,103 S | 6/2015 | Jeong et al. | |
| 9,081,944 B2 | 7/2015 | Camacho et al. | |
| 9,510,159 B1 | 11/2016 | Cuddihy et al. | |
| D773,439 S | 12/2016 | Walker | |
| D775,158 S | 12/2016 | Dong et al. | |
| D777,710 S | 1/2017 | Palmborg et al. | |
| D788,079 S | 5/2017 | Son et al. | |

(56) References Cited

U.S. PATENT DOCUMENTS

| | | |
|---|---|---|
| 2001/0005197 A1 | 6/2001 | Mishra et al. |
| 2001/0027121 A1 | 10/2001 | Boesen |
| 2001/0043707 A1 | 11/2001 | Leedom |
| 2001/0056350 A1 | 12/2001 | Calderone et al. |
| 2002/0002413 A1 | 1/2002 | Tokue |
| 2002/0007510 A1 | 1/2002 | Mann |
| 2002/0010590 A1 | 1/2002 | Lee |
| 2002/0030637 A1 | 3/2002 | Mann |
| 2002/0046035 A1 | 4/2002 | Kitahara et al. |
| 2002/0057810 A1 | 5/2002 | Boesen |
| 2002/0076073 A1 | 6/2002 | Taenzer et al. |
| 2002/0118852 A1 | 8/2002 | Boesen |
| 2003/0002705 A1 | 1/2003 | Boesen |
| 2003/0065504 A1 | 4/2003 | Kraemer et al. |
| 2003/0100331 A1 | 5/2003 | Dress et al. |
| 2003/0104806 A1 | 6/2003 | Ruef et al. |
| 2003/0115068 A1 | 6/2003 | Boesen |
| 2003/0125096 A1 | 7/2003 | Boesen |
| 2003/0218064 A1 | 11/2003 | Conner et al. |
| 2003/0220584 A1* | 11/2003 | Honeyager ........ A61B 5/0285 |
| | | 600/559 |
| 2004/0070564 A1 | 4/2004 | Dawson et al. |
| 2004/0160511 A1 | 8/2004 | Boesen |
| 2005/0017842 A1 | 1/2005 | Dematteo |
| 2005/0043056 A1 | 2/2005 | Boesen |
| 2005/0094839 A1 | 5/2005 | Gwee |
| 2005/0125320 A1 | 6/2005 | Boesen |
| 2005/0148883 A1 | 7/2005 | Boesen |
| 2005/0165663 A1 | 7/2005 | Razumov |
| 2005/0196009 A1 | 9/2005 | Boesen |
| 2005/0251455 A1 | 11/2005 | Boesen |
| 2005/0266876 A1 | 12/2005 | Boesen |
| 2006/0029246 A1 | 2/2006 | Boesen |
| 2006/0073787 A1 | 4/2006 | Lair et al. |
| 2006/0074671 A1 | 4/2006 | Farmaner et al. |
| 2006/0074808 A1 | 4/2006 | Boesen |
| 2006/0166715 A1 | 7/2006 | Engelen et al. |
| 2006/0166716 A1 | 7/2006 | Seshadri et al. |
| 2006/0220915 A1 | 10/2006 | Bauer |
| 2006/0258412 A1 | 11/2006 | Liu |
| 2008/0076972 A1 | 3/2008 | Dorogusker et al. |
| 2008/0090622 A1 | 4/2008 | Kim et al. |
| 2008/0146890 A1 | 6/2008 | LeBoeuf et al. |
| 2008/0166005 A1* | 7/2008 | Terlizzi ................ H04R 1/083 |
| | | 381/375 |
| 2008/0254780 A1 | 10/2008 | Kuhl et al. |
| 2008/0255430 A1 | 10/2008 | Alexandersson et al. |
| 2009/0003620 A1 | 1/2009 | McKillop et al. |
| 2009/0005700 A1* | 1/2009 | Joshi ................ A61B 5/0488 |
| | | 600/546 |
| 2009/0008275 A1 | 1/2009 | Ferrari et al. |
| 2009/0017881 A1 | 1/2009 | Madrigal |
| 2009/0073070 A1 | 3/2009 | Rofougaran |
| 2009/0097689 A1 | 4/2009 | Prest et al. |
| 2009/0105548 A1 | 4/2009 | Bart |
| 2009/0191920 A1 | 7/2009 | Regen et al. |
| 2009/0245559 A1 | 10/2009 | Boltyenkov et al. |
| 2009/0261114 A1 | 10/2009 | McGuire et al. |
| 2009/0296968 A1 | 12/2009 | Wu et al. |
| 2010/0033313 A1 | 2/2010 | Keady et al. |
| 2010/0203831 A1 | 8/2010 | Muth |
| 2010/0210212 A1 | 8/2010 | Sato |
| 2010/0320961 A1 | 12/2010 | Castillo et al. |
| 2011/0140844 A1 | 6/2011 | McGuire et al. |
| 2011/0239497 A1 | 10/2011 | McGuire et al. |
| 2011/0286615 A1 | 11/2011 | Olodort et al. |
| 2012/0057740 A1 | 3/2012 | Rosal |
| 2012/0149467 A1* | 6/2012 | Heck .................. A63F 13/235 |
| | | 463/36 |
| 2012/0229248 A1* | 9/2012 | Parshionikar .......... G08B 21/06 |
| | | 340/3.1 |
| 2013/0316642 A1 | 11/2013 | Newham |
| 2013/0346168 A1 | 12/2013 | Zhou et al. |
| 2014/0079257 A1 | 3/2014 | Ruwe et al. |
| 2014/0106677 A1 | 4/2014 | Altman |
| 2014/0122116 A1 | 5/2014 | Smythe |
| 2014/0153768 A1 | 6/2014 | Hagen et al. |
| 2014/0160248 A1* | 6/2014 | Pomerantz ............ G06F 1/163 |
| | | 348/47 |
| 2014/0163771 A1 | 6/2014 | Demeniuk |
| 2014/0185828 A1 | 7/2014 | Helbling |
| 2014/0219467 A1 | 8/2014 | Kurtz |
| 2014/0222462 A1 | 8/2014 | Shakil et al. |
| 2014/0235169 A1 | 8/2014 | Parkinson et al. |
| 2014/0270227 A1 | 9/2014 | Swanson |
| 2014/0270271 A1 | 9/2014 | Dehe et al. |
| 2014/0335908 A1 | 11/2014 | Krisch et al. |
| 2014/0348367 A1 | 11/2014 | Vavrus et al. |
| 2015/0028996 A1 | 1/2015 | Agrafioti et al. |
| 2015/0110587 A1 | 4/2015 | Hori |
| 2015/0148989 A1 | 5/2015 | Cooper et al. |
| 2015/0245127 A1 | 8/2015 | Shaffer |
| 2015/0261298 A1* | 9/2015 | Li ............................ G06F 3/017 |
| | | 345/156 |
| 2015/0366471 A1* | 12/2015 | LeBoeuf ............ A61B 5/0059 |
| | | 600/301 |
| 2016/0033280 A1 | 2/2016 | Moore et al. |
| 2016/0072558 A1 | 3/2016 | Hirsch et al. |
| 2016/0073189 A1 | 3/2016 | Lindén et al. |
| 2016/0100676 A1* | 4/2016 | Sandanger .............. A45F 5/00 |
| | | 224/181 |
| 2016/0109961 A1* | 4/2016 | Parshionikar .......... G06F 3/013 |
| 2016/0125892 A1 | 5/2016 | Bowen et al. |
| 2016/0353195 A1* | 12/2016 | Lott .................. H04W 12/0605 |
| 2016/0360350 A1* | 12/2016 | Watson .................. H04W 4/70 |
| 2017/0059152 A1 | 3/2017 | Hirsch et al. |
| 2017/0060262 A1 | 3/2017 | Hviid et al. |
| 2017/0060269 A1 | 3/2017 | Förstner et al. |
| 2017/0061751 A1 | 3/2017 | Loermann et al. |
| 2017/0062913 A1 | 3/2017 | Hirsch et al. |
| 2017/0064426 A1 | 3/2017 | Hviid |
| 2017/0064428 A1 | 3/2017 | Hirsch |
| 2017/0064432 A1 | 3/2017 | Hviid et al. |
| 2017/0064437 A1 | 3/2017 | Hviid et al. |
| 2017/0078780 A1* | 3/2017 | Qian ...................... H04R 1/1091 |
| 2017/0078785 A1* | 3/2017 | Qian ...................... H04R 1/1016 |
| 2017/0108918 A1 | 4/2017 | Boesen |
| 2017/0109131 A1 | 4/2017 | Boesen |
| 2017/0110124 A1 | 4/2017 | Boesen et al. |
| 2017/0110899 A1 | 4/2017 | Boesen |
| 2017/0111723 A1 | 4/2017 | Boesen |
| 2017/0111725 A1 | 4/2017 | Boesen et al. |
| 2017/0111726 A1 | 4/2017 | Martin et al. |
| 2017/0111740 A1 | 4/2017 | Hviid et al. |
| 2017/0151447 A1 | 6/2017 | Boesen |
| 2017/0151668 A1 | 6/2017 | Boesen |
| 2017/0151918 A1 | 6/2017 | Boesen |
| 2017/0151930 A1 | 6/2017 | Boesen |
| 2017/0151957 A1 | 6/2017 | Boesen |
| 2017/0151959 A1 | 6/2017 | Boesen |
| 2017/0153114 A1 | 6/2017 | Boesen |
| 2017/0153636 A1 | 6/2017 | Boesen |
| 2017/0154532 A1 | 6/2017 | Boesen |
| 2017/0155985 A1 | 6/2017 | Boesen |
| 2017/0155992 A1 | 6/2017 | Perianu et al. |
| 2017/0155993 A1 | 6/2017 | Boesen |
| 2017/0155997 A1 | 6/2017 | Boesen |
| 2017/0155998 A1 | 6/2017 | Boesen |
| 2017/0156000 A1 | 6/2017 | Boesen |
| 2017/0164089 A1* | 6/2017 | Lee ...................... H04R 1/1025 |
| 2017/0178631 A1 | 6/2017 | Boesen |
| 2017/0180842 A1 | 6/2017 | Boesen |
| 2017/0180843 A1 | 6/2017 | Perianu et al. |
| 2017/0180897 A1 | 6/2017 | Perianu |
| 2017/0188127 A1 | 6/2017 | Perianu et al. |
| 2017/0188132 A1 | 6/2017 | Hirsch et al. |
| 2017/0195829 A1 | 7/2017 | Belverato et al. |
| 2017/0208393 A1 | 7/2017 | Boesen |
| 2017/0214987 A1 | 7/2017 | Boesen |
| 2017/0215016 A1 | 7/2017 | Dohmen et al. |
| 2017/0230752 A1 | 8/2017 | Dohmen et al. |

(56) References Cited

U.S. PATENT DOCUMENTS

| | | | |
|---|---|---|---|
| 2017/0257698 A1 | 9/2017 | Boesen et al. | |
| 2018/0107275 A1* | 4/2018 | Chen | G06F 3/01 |

FOREIGN PATENT DOCUMENTS

| | | | |
|---|---|---|---|
| CN | 104837094 A | 8/2015 | |
| EP | 1469659 A1 | 10/2004 | |
| EP | 1017252 A3 | 5/2006 | |
| EP | 2903186 A1 | 8/2015 | |
| GB | 2074817 | 4/1981 | |
| GB | 2508226 A | 5/2014 | |
| WO | 2008103925 A1 | 8/2008 | |
| WO | 2007034371 A3 | 11/2008 | |
| WO | 2011001433 A2 | 1/2011 | |
| WO | 2012071127 A1 | 5/2012 | |
| WO | 2013134956 A1 | 9/2013 | |
| WO | 2014046602 A1 | 3/2014 | |
| WO | 2014043179 A3 | 7/2014 | |
| WO | 2015061633 A2 | 4/2015 | |
| WO | 2015110577 A1 | 7/2015 | |
| WO | 2015110587 A1 | 7/2015 | |
| WO | 2016032990 A1 | 3/2016 | |

OTHER PUBLICATIONS

Announcing the $3,333,333 Stretch Goal (Feb. 24, 2014).
Ben Coxworth: "Graphene-based ink could enable low-cost, foldable electronics", "Journal of Physical Chemistry Letters", Northwestern University, (May 22, 2013).
Blain: "World's first graphene speaker already superior to Sennheiser MX400", htt://www.gizmag.com/graphene-speaker-beats-sennheiser-mx400/31660, (Apr. 15, 2014).
BMW, "BMW introduces BMW Connected—The personalized digital assistant", "http://bmwblog.com/2016/01/05/bmw-introduces-bmw-connected-the-personalized-digital-assistant", (Jan. 5, 2016).
Bragi is on Facebook (2014).
Bragi Update—Arrival of Prototype Chassis Parts—More People—Awesomeness (May 13, 2014).
Bragi Update—Chinese New Year, Design Verification, Charging Case, More People, Timeline(Mar. 6, 2015).
Bragi Update—First Sleeves From Prototype Tool—Software Development Kit (Jun. 5, 2014).
Bragi Update—Let's Get Ready to Rumble, a Lot to be Done Over Christmas (Dec. 22, 2014).
Bragi Update—Memories From April—Update on Progress (Sep. 16, 2014).
Bragi Update—Memories from May—Update on Progress—Sweet (Oct. 13, 2014).
Bragi Update—Memories From One Month Before Kickstarter—Update on Progress (Jul. 10, 2014).
Bragi Update—Memories From the First Month of Kickstarter—Update on Progress (Aug. 1, 2014).
Bragi Update—Memories From the Second Month of Kickstarter—Update on Progress (Aug. 22, 2014).
Bragi Update—New People @Bragi—Prototypes (Jun. 26, 2014).
Bragi Update—Office Tour, Tour to China, Tour to CES (Dec. 11, 2014).
Bragi Update—Status on Wireless, Bits and Pieces, Testing-Oh Yeah, Timeline(Apr. 24, 2015).
Bragi Update—the App Preview, the Charger, the SDK, Bragi Funding and Chinese New Year (Feb. 11, 2015).
Bragi Update—What We Did Over Christmas, Las Vegas & CES (Jan. 19, 2014).
Bragi Update—Years of Development, Moments of Utter Joy and Finishing What We Started(Jun. 5, 2015).
Bragi Update—Alpha 5 and Back to China, Backer Day, on Track(May 16, 2015).
Bragi Update—Beta2 Production and Factory Line(Aug. 20, 2015).
Bragi Update—Certifications, Production, Ramping Up.
Bragi Update—Developer Units Shipping and Status(Oct. 5, 2015).
Bragi Update—Developer Units Started Shipping and Status (Oct. 19, 2015).
Bragi Update—Update-Developer Units, Investment, Story and Status(Nov. 2, 2015).
Bragi Update—Update-Getting Close(Aug. 6, 2015).
Bragi Update—Update-On Track, Design Verification, How It Works and What's Next(Jul. 15, 2015).
Bragi Update—Update-On Track, on Track and Gems Overview.
Bragi Update—Update-Status on Wireless, Supply, Timeline and Open House@Bragi(Apr. 1, 2015).
Bragi Update—Update-Unpacking Video, Reviews on Audio Perform and Boy are We Getting Close(Sep. 10, 2015).
Healthcare Risk Management Review, "Nuance updates computer-assisted physician documentation solution" (Oct. 20, 2016).
Hoyt et. al., "Lessons Learned from Implementation of Voice Recognition for Documentation in the Military Electronic Health Record System", the American Health Information Management Association (2017).
Hyundai Motor America, "Hyundai Motor Company Introduces a Health + Mobility Concept for Wellness in Mobility", Fountain Valley, Californa (2017).
International Search Report & Written Opinion, PCT/EP2016/070231 (dated Nov. 18, 2016).
Last Push Before the Kickstarter Campaign Ends on Monday 4pm CET (Mar. 28, 2014).
Nigel Whitfield: "Fake tape detectors, 'from the stands' footie and UGH? Internet of Things in my set-top box"; http://www.theregister.co.uk/2014/09/24/ibc_round_up_object_audio_dlna_iot/ (Sep. 24, 2014).
Staab, Wayne J., et al., "A One-Size Disposable Hearing Aid is Introduced", the Hearing Journal 53(4):36-41) Apr. 2000.
Stretchgoal—Its Your Dash (Feb. 14, 2014).
Stretchgoal—the Carrying Case for the Dash (Feb. 12, 2014).
Stretchgoal—Windows Phone Support (Feb. 17, 2014).
The Dash + the Charging Case & the Bragi News (Feb. 21, 2014).
The Dash—A Word From Our Software, Mechanical and Acoustics Team + an Update (Mar. 11, 2014).
Update From Bragi—$3,000,000—Yipee (Mar. 22, 2014).
Wikipedia, "Gamebook", https://en.wikipedia.org/wiki/Gamebook, Sep. 3, 2017, 5 pages.
Wikipedia, "Kinect", "https://en.wikipedia.org/wiki/Kinect", 18 pages, (Sep. 9, 2017).
Wikipedia, "Wii Balance Board", "https://en.wikipedia.org/wiki/Wii_Balance_Board", 3 pages, (Jul. 20, 2017).

* cited by examiner

MEASUREMENT OF FACIAL MUSCLE EMG POTENTIALS FOR PREDICTIVE ANALYSIS USING A SMART WEARABLE SYSTEM AND METHOD

PRIORITY STATEMENT

This application claims priority to U.S. Provisional Patent Application 62/393,926, filed on Sep. 13, 2016, and entitled "Measurement of Facial Muscle EMG Potentials for Predictive Analysis Using a Smart Wearable System and Method", hereby incorporated by reference in its entirety.

FIELD OF THE INVENTION

The present invention relates to wearable devices. More particularly, but not exclusively, the present invention relates to wearable devices that may be modified by facial gestures.

BACKGROUND

Gestural based control systems have their limitations. Precision spatial location is essential for the proper determination of the gestural command. If the position of the measured segment of the body is not in optimal location, errors may occur. Given these issues, what is needed are improved methods, apparatus, and systems for wireless control systems based on gestures.

SUMMARY

According to one aspect, electromyogram (EMG) technology is used to measure the electrical activity of a user's facial muscles. Most people are able to control their facial muscles to such a degree as to permit monitoring by an electronic sensor in order to control a wearable device. In addition, the electrical activity of the muscles of the head and neck region may also be measured to provide additional levels of control to the wearable device. Data collected may be used to provide improved gesture control. Data collected may be combined with data from inertial sensors.

Therefore, it is a primary object, feature, or advantage to improve over the state of the art.

It is a further object, feature, or advantage to assist paralyzed individuals In participating in the activities of life through recognition of control patterns based on facial EMG presets.

It is a still further object, feature, or advantage to allow a user to select EMG control settings in lieu of, or in addition to other control inputs including gesture based controls via accelerometer macros.

Another object, feature, or advantage is to provide greater precision in fine tuning the control functions of a device.

Yet another object, feature, or advantage is the transmission of EMG functional data to receptor devices. This allows the receptor device or devices to better respond to the inputs/commands of the user.

A further object, feature, or advantage is to provide bio-medical monitoring of the user through the use of sensor array systems.

A still further object, feature, or advantage is to augment accelerometer based solutions for control of macros.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by any object, features or advantage stated herein.

According to one aspect a system includes at least one wearable device, wherein each wearable device includes a processor, a gesture control interface operatively connected to the processor, at least one sensor configured to detect electrical activity from a user's facial muscles, the at least one sensor operatively connected to the processor, and wherein the processor is configured to interpret the electrical activity from the user's facial muscles as a first command to perform action according to a pre-determined user setting. The at least one sensor may be an electromyogram (EMG) sensor. Each wearable device may further include a transceiver operatively connected to the processor. The at least one wearable device may include a set of earpieces comprising a first earpiece and a second earpiece. The first earpiece may further include at least one microphone operatively connected to the processor and at least one speaker operatively connected to the processor. The first earpiece may be further configured not to interpret the electrical activity from the user's facial muscles as a command if the user is talking as determined using the at least one microphone. The first earpiece may further include an inertial sensor operatively connected to the processor and wherein the processor is configured to interpret the electrical activity from the user's facial muscles in combination with at least one of head orientation or movement as a second command. The at least one wearable device may include a set of earphones. The system may further include a software application executing on a mobile device configured to provide for modifying the pre-determined user setting.

According to another aspect, a method for using facial muscle electromyogram (EMG) potential as input may include providing at least one wearable device, wherein each wearable device includes a processor, a gesture control interface operatively connected to the processor, at least one EMG sensor configured to detect electrical activity from a user's facial muscles, the at least one EMG sensor operatively connected to the processor. The is configured to interpret the electrical activity from the user's facial muscles as a first command to perform an action according to a pre-determined user setting. The method may further include receiving the facial muscle EMG potentials at the at least one EMG sensor and interpreting at the processor the facial muscle EMG potentials as a first command to perform the action according to a pre-determined user setting.

DETAILED DESCRIPTION

Figure 1:
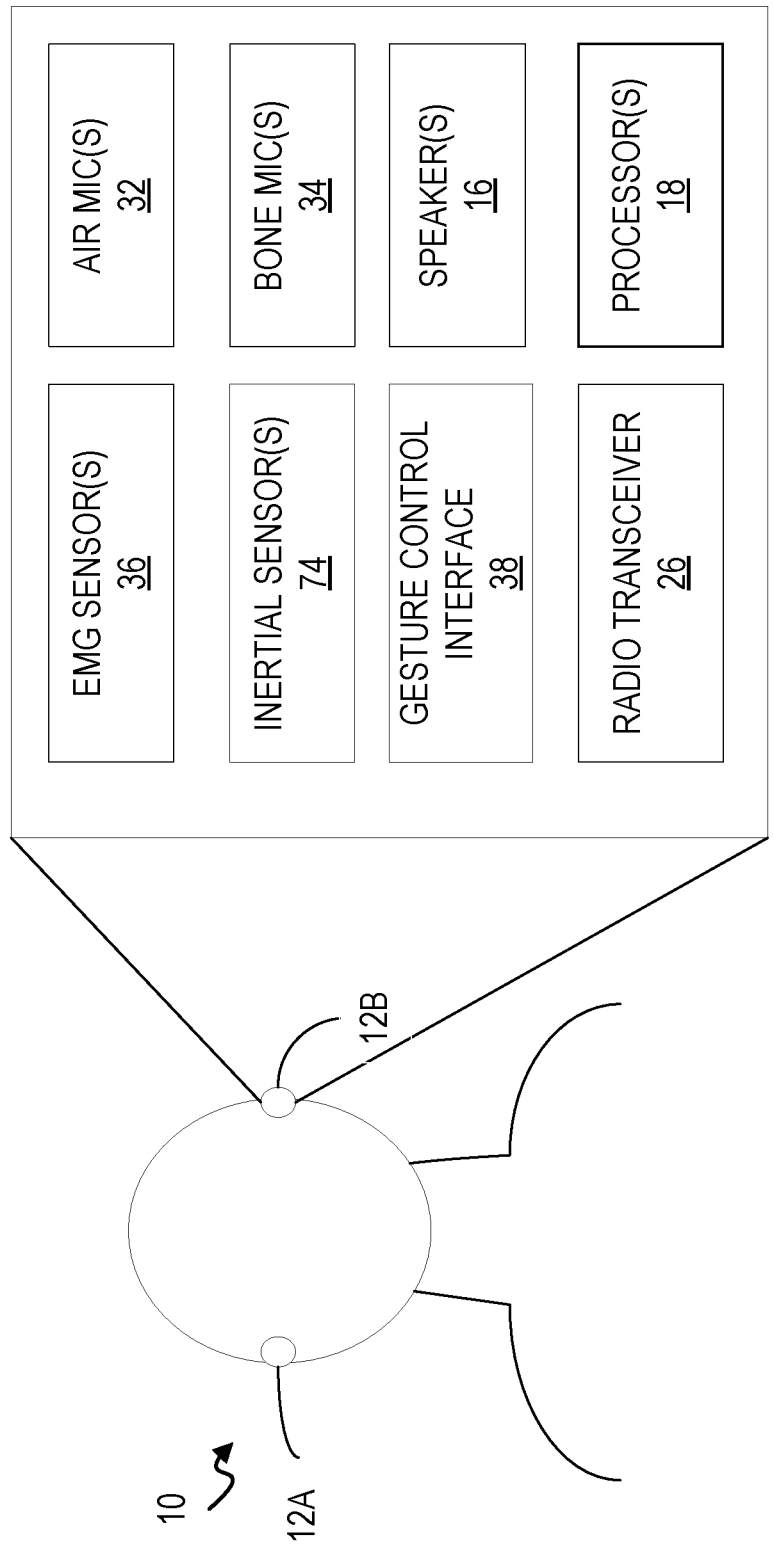
FIG. 1 includes a block diagram of one embodiment of the system.

FIG. 1 illustrates one example of a wearable device in the form of a set of wireless earpieces 10 which includes a right earpiece 12A and a left earpiece 12B. The set of wireless earpieces are configured to detect muscle contractions such as through use of one or more EMG sensors 36. The one or more EMG sensors 36 may contact one or more muscles to detect muscle contractions. For example, changes such as tightening or loosening of the jaw by the associated muscles may be detected. The placement of the one or more EMG sensors 36 determines which muscle contractions may be sensed. The muscle contractions may be deliberate by a user with the user making the muscle contractions for the purpose of providing input into the wearable device.

The EMG sensors 36 may be combined with additional forms of user input. This may include one or more inertial sensors 74, a gesture control interface 38, one or more air microphones 32, and one or more bone microphones 34. The one or more inertial sensors 74 may include a 9-axis inertial sensor which includes a 3-axis accelerometer, a 3-axis gyrometer, and a 3-axis compass.

The wireless earpiece 12B may also include a radio transceiver 26 such as a BLE, BLUETOOTH, Wi-Fi, or other type of radio transceiver, one or more speakers 16, and one or more processors 18. The one or more processors 18 may be operatively connected to the other components including the one or more EMG sensors 36, the one or more air microphones 32, the inertial sensor 74, the one or more bone microphones 34, the gesture control interface 38, the one or more speakers 16, and the radio transceiver 38.

Where one or more bone conduction microphones 34 and/or one or more air microphones 32 are present, signals from the microphones 34, 32 may be used to determine when certain muscle movement detected with the EMG sensors 36 is associated with speech of the user and when it is not. Thus, for example, when speaking a user would be moving their mouth which requires engaging a number of different muscles. The wireless earpiece may associate the readings from the one or more EMG sensors 36 with speech and thus not consider input received through the EMG sensors 36 to be user input to perform particular actions.

Figure 2:
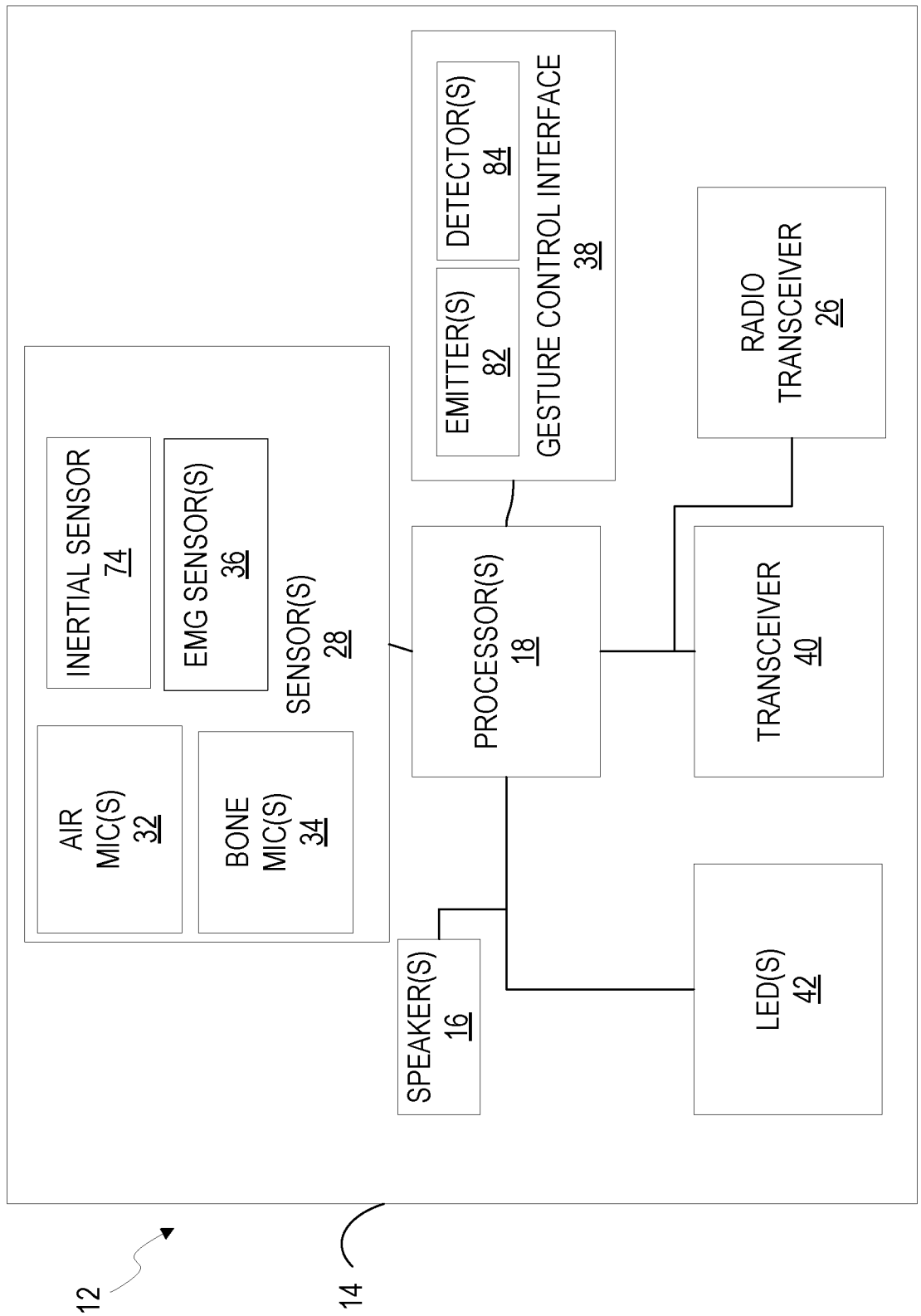
FIG. 2 illustrates a block diagram of a second embodiment of the system.

FIG. 2 is a block diagram further illustrating one example of an earpiece 12. The earpiece 12 has a housing 14. Disposed within the housing 14 is one or more processors 18 which may include microprocessors, digital signal processors, mixed signal processors, or other types of processors. The processor 18 is operatively connected to a plurality of sensors 28. The plurality of sensors 28 may include one or more air microphones 32, one or more bone microphones 34, one or more inertial sensors 74, and one or more EMG sensors 76. One or more speakers 16 are also operatively connected to the processor 18. One or more LEDs may be operatively connected to the processor to display status or other purposes. A radio transceiver 26 is operatively connected to the processor and a transceiver 40 may also be operatively connected to the processor 18. The transceiver 40 may be a near field magnetic induction (NFMI) transceiver or other type of transceiver. In some embodiments, the transceiver 40 may be used to communicate between a left earpiece and a right earpiece. In such an embodiment, only one earpiece 12 within a set of earpieces would need to have a radio transceiver 26. The gesture control interface 38 is also operative connected to the one or more processors 18. The gesture control interface 38 may include one or more emitters 82 and one or more detectors 84 to emit and detect an energy field. For example, the one or more emitters 82 may emit light and the one or more detectors 84 may detect reflected light. A user may perform gestures proximate the gesture control interface 30 in order to provide user input. For example, a user may perform one or more taps, holds, swipes, or other gestures to provide user input. Other technologies may be used to emit and detect other types of energy field.

It is also to be understood that in order to provide user input, a user may combine one more gestures as determined by the gesture control interface 38 with one or more facial expressions as determined by the one or more EMG sensors 76 in addition to one or more head movements or head orientations as determined by the one or more inertial sensors 74. Thus, complex input from a user may be quickly communicated using a combination of modalities and in a manner that may be more private than providing voice commands.

Figure 3:
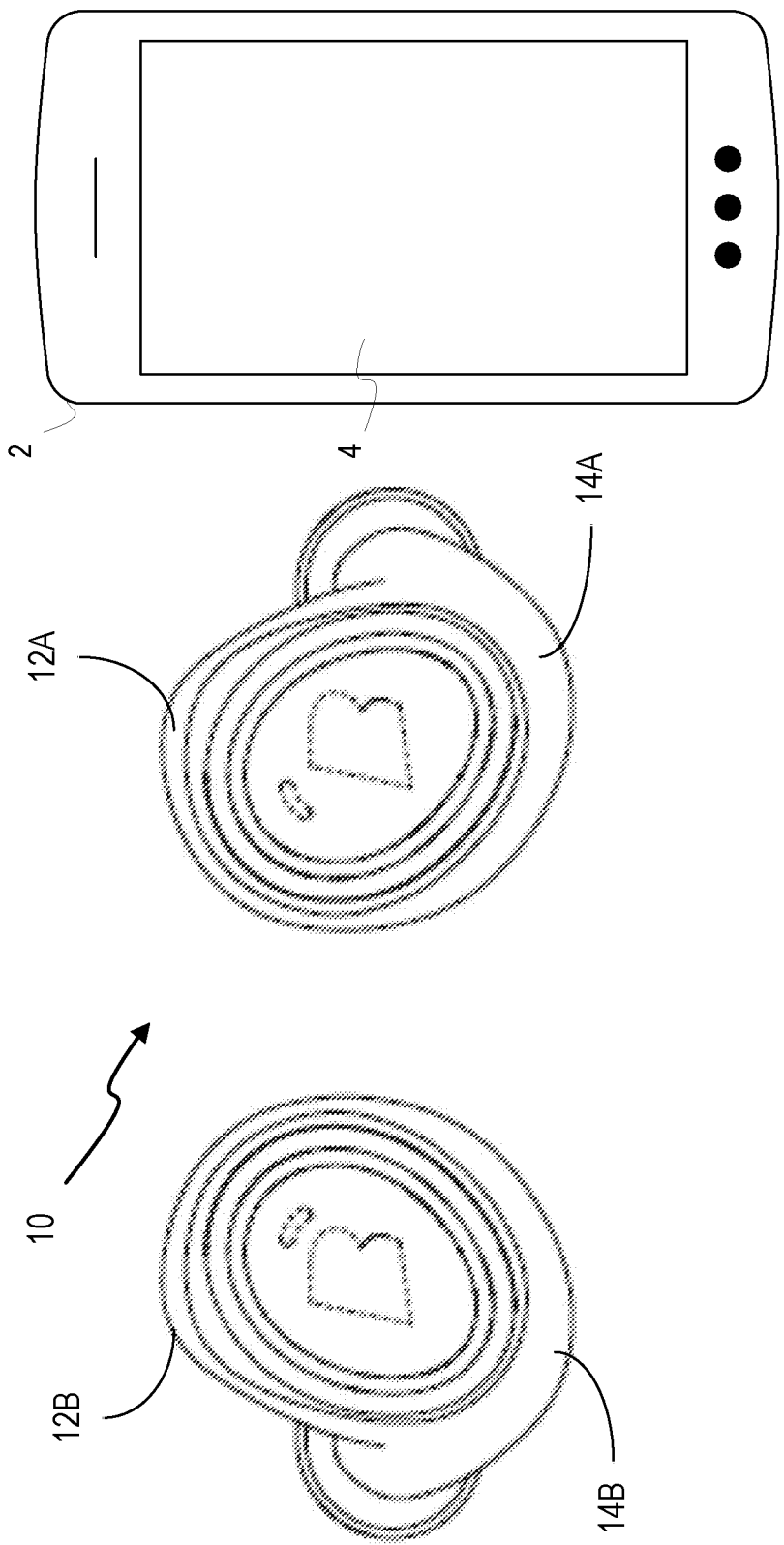
FIG. 3 illustrates a set of wireless earpieces in communication with a mobile device executing a software application.

FIG. 3 illustrates one example of a set of wireless earpieces 10 which includes a first earpiece 12A and a second earpiece 12B, the first earpiece 12A having a first earpiece housing 14A and the second earpiece 12B having a second earpiece housing 14B. A receptor device such as a mobile device 2 such as a mobile phone is also shown. The mobile device 2 includes a display 4. A software application may execute on a processor of the mobile device 2 for controlling settings associated with the set of wireless earpieces 10. The settings may allow for a user to map different muscle movement or different facial expressions or gestures to different actions. The facial gesture may be a wink, a wince, a smile, one or more blinks, or any facial expression a user is capable of making, and need not be limited to a single gesture. It should also be understood that the gesture or associated muscle contractions being detected may be on the user's face or neck. The electrical reading may be from anywhere on the user's face or neck and need not be performed in a single step. For example, a series of muscle contractions may be indicative of a particular gesture, or a combination of different muscle contractions may be indicative of a particular gesture. One or more processors then interprets the facial muscular electrical data to determine a user response. The wearable device may then perform an action based on the user response.

It is also to be understood that instead of performing processing of EMG sensor data on one or more of the earpieces, this data may be communicated such as over a wireless communication linkage such as a BLE or BLUETOOTH connection to the mobile device 2. The mobile device 2 may then perform processing and return results to the set of wireless earpieces 10. Alternatively, the mobile device 2 may communicate the sensor data over a network to a remote location such as to a cloud computing service which may analyze the data and return the results of the analysis to the mobile device 2 and then in turn to the set of wireless earpieces 10 if so desired. It is also contemplated that the same data may be analyzed in multiple locations and that different types of analysis may occur depending on the location. For example, the most computationally intensive forms of analyses may be performed at a remote location with greater computation resources than present in the set of wireless earpieces 10.

Figure 4:
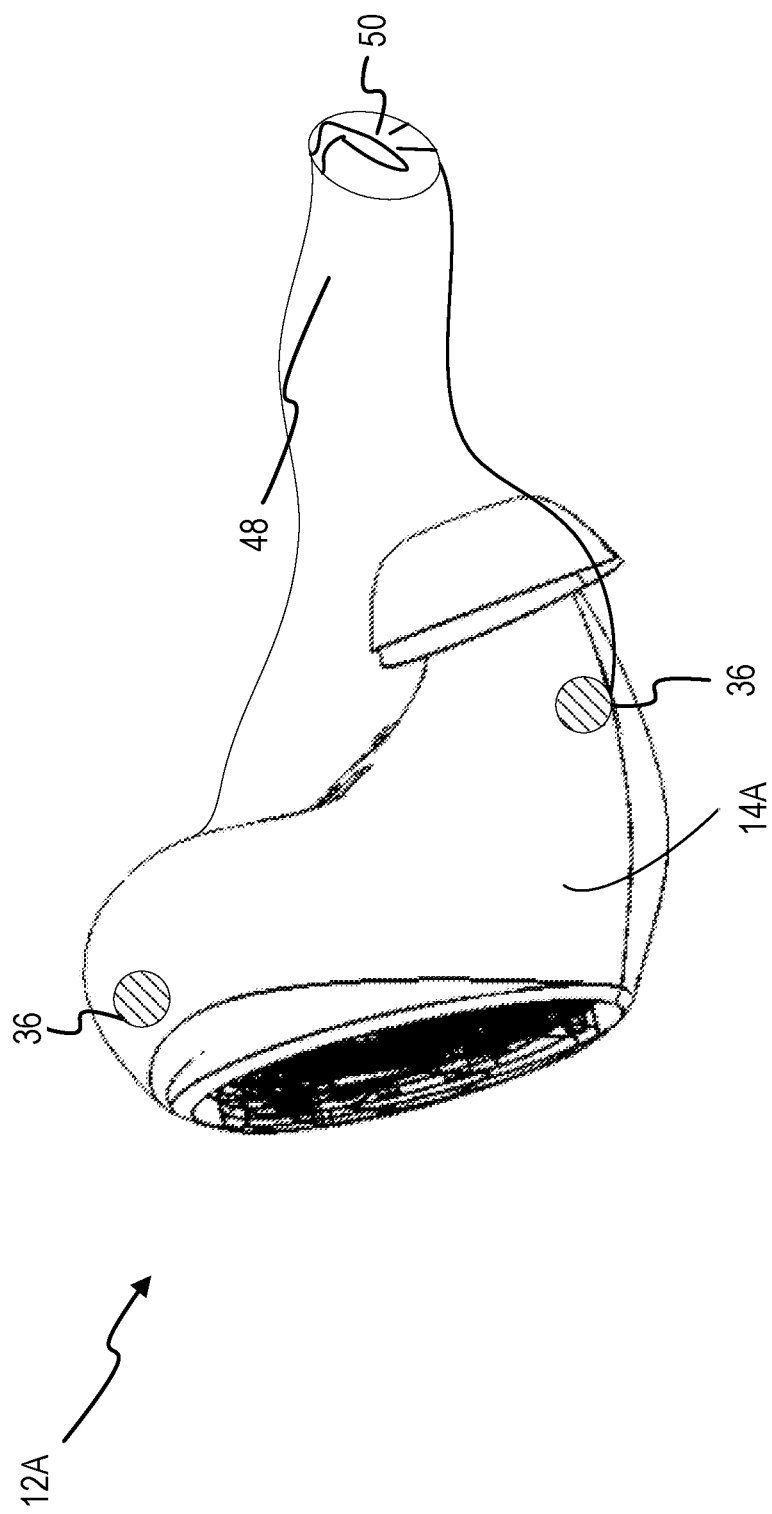
FIG. 4 illustrates one example of an earpiece seated in an ear.

FIG. 4 illustrates the earpiece 12A inserted into an ear of a user and illustrates an external auditory canal 48 and tympanic membrane 40. One or more EMG sensors 36 may be placed at an external surface of the earpiece housing 14A so as to contact a skin surface of the user in order to detect electrical activity associated with muscle movement. Although particular positions are shown, it is to be understood that any number of other positions may be used as may be appropriate depending upon the muscles to be monitored and the size, shape, and configuration of the ear piece or other wearable device.

Because a human is able to control the muscles of facial expression to impressive degrees, the precise control allows the user to transfer nuances of the human emotion spectrum. Such slight movement of the muscles of facial expression can be monitored, and their activity harnessed. Additionally, larger muscles of the head and neck may be able to be activated in order to provide other levels of biometric EMG control inputs to the device. These device inputs may also be preset such as via a software application executing on a mobile device. Thus, user settings may be modified using the software application. Any number of actions may be performed as determined by a user. This may, for example, include actions to initiate a phone call to a particular person or place, listen to a particular song or other audio selection, begin an activity, or any number of other actions which the wearable device may perform.

Biometric data from the EMG sensors may also be relayed to receptor devices without the need or requirement for EMG controls. The array of biometric EMG sensors may be used to better understand the emotional and physiologic status of the user. Such data may be used predictively as well as eliciting a pre-programmed response. In particular, instead of relying upon pre-determined user settings to associate facial expressions with specific commands, the facial expressions may be used to predict user actions or user needs. For, example, where voice feedback is being provided to a user of an earpiece presenting options to a user and a user winces in response to an option, the facial expression may be interpreted as a "no".

Figure 5:
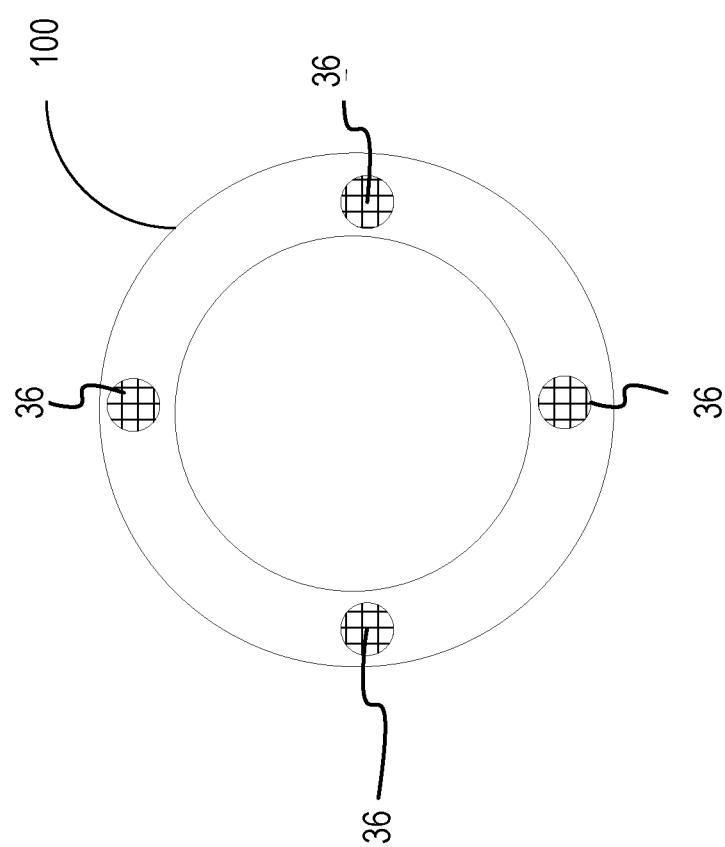
FIG. 5 illustrates a portion of an earphone with a plurality of EMG sensors.

FIG. 5 illustrates an inside portion of an ear cup housing of a set of earphones. A plurality of EMG sensors 36 are positioned around the ear cup housing and may be used to sense muscle activity. More or fewer EMG sensors 36 may be present and the EMG sensors may be of varying sizes and shapes. It is to be understood that the EMG sensors may be associated with other types of wearable devices as well.

Although various methods, systems, and apparatuses have been shown and described herein, the present invention contemplates any number of options, variations, and alternative embodiments. For example, it is contemplated that the wearable device may be of any number of types of devices and any number of different facial gestures may be recognized.

What is claimed is:

1. A system comprising:
a set of earpieces comprising a first earpiece and a second earpiece, wherein each earpiece comprises:
a) an earpiece housing;
b) a processor disposed within the earpiece housing,
c) a gesture control interface operatively connected to the processor,
d) at least one sensor, located at an external surface of the earpiece housing, configured to detect electrical activity from a user's facial muscles, the at least one sensor operatively connected to the processor and wherein the at least one sensor is an electromyogram (EMG) sensor,
e) wherein the processor is configured to interpret the electrical activity from the user's facial muscles as a first command to perform action according to a pre-determined user setting,
f) an inertial sensor operatively connected to the processor and wherein the processor is further configured to interpret the electrical activity from the user's facial muscles in combination with at least one of head orientation or movement as a second command,
g) at least one microphone operatively connected to the processor;
h) at least one speaker operatively connected to the processor;
wherein the set of earpieces is configured not to interpret the electrical activity from the user's facial muscles as a command if the user is talking as determined using the at least one microphone;
wherein the set of earpieces is configured to provide voice feedback to the user using the at least one speaker, monitor a response to the voice feedback using the electrical activity from the user's facial muscles, and interpret the electrical activity from the user's facial muscles in response to the voice feedback.

2. The system of claim 1 wherein each earpiece further comprises a transceiver operatively connected to the processor.

3. The system of claim 1 wherein the set of earpieces comprises a set of earphones.

4. The system of claim 1 further comprising a software application executing on a mobile device configured to provide for modifying the pre-determined user setting.

5. A method for using facial muscle electromyogram (EMG) potential as input for a set of earpieces comprising a first earpiece and a second earpiece, the first earpiece comprising:
a) an earpiece housing,
b) a processor disposed within the earpiece housing,
c) a gesture control interface operatively connected to the processor,
d) at least one EMG sensor, placed on an external surface of the earpiece housing, configured to detect electrical activity from a user's facial muscles, the at least one EMG sensor operatively connected to the processor, and
e) at least one inertial sensor configured to detect a user's head movement, the at least one inertial sensor operatively connected to the processor,
f) at least one microphone operatively connected to the processor and at least one speaker operatively connected to the processor,
generating voice feedback at the at least one speaker;
receiving the facial muscle EMG potentials at the at least one EMG sensor in response to the voice feedback;
receiving audio input from the at least one microphone at the processor in response to the voice feedback;
receiving inertial data indicative of the user's head movement from the at least one inertial sensor at the processor in response to the voice feedback;
interpreting at the processor the facial muscle EMG potentials, the audio input, and the inertial data to determine occurrence of a command to perform an action according to a pre-determined user setting;
wherein the processor is configured not to interpret the electrical activity from the user's facial muscles as the command if the user is talking as determined using the audio input from the at least one microphone.

6. The method of claim 5 wherein each earpiece further comprises a transceiver operatively connected to the processor.

7. An earpiece comprises
(a) a processor disposed within an earpiece housing,
(b) a gesture control interface operatively connected to the processor,
(c) at least one sensor configured to detect electrical activity from a user's facial muscles, the at least one sensor operatively connected to the processor, (d) an inertial sensor operatively connected to the processor, and
(e) at least one microphone operatively connected to the processor; wherein the processor associates the electrical activity from the user's facial muscles with speech if the electrical activity from the user's facial muscles is detected along with an input from the at least one microphone;
(f) wherein the processor is configured to interpret the electrical activity from the user's facial muscles in combination with no input from the at least one microphone and input from the inertial sensor as a command to perform action according to a pre-determined user setting;
(g) wherein the earpieces is configured to provide voice feedback to the user using at least one speaker, monitor a response to the voice feedback using the electrical activity from the user's facial muscles, and interpret the electrical activity from the user's facial muscles in response to the voice feedback.

8. The earpiece of claim 7 wherein the at least one sensor is an electromyogram (EMG) sensor.

9. The earpiece of claim 7 wherein the earpiece further comprises a transceiver operatively connected to the processor.

10. The earpiece of claim 9 further comprising a 9-axis inertial sensor operatively connected to the processor which includes a 3-axis accelerometer, a 3-axis gyrometer, and a 3-axis compass.

* * * * *